Dec. 4, 1928.

J. C. HOLLANDS

ELECTRIC COOKING STOVE

Filed Nov. 21, 1925

1,693,784

INVENTOR.
John C. Hollands
BY
ATTORNEYS.

Patented Dec. 4, 1928.

1,693,784

UNITED STATES PATENT OFFICE.

JOHN C. HOLLANDS, OF ERIE, PENNSYLVANIA, ASSIGNOR TO THE GRISWOLD MANUFACTURING COMPANY, OF ERIE, PENNSYLVANIA, A CORPORATION OF PENNSYLVANIA.

ELECTRIC COOKING STOVE.

Application filed November 21, 1925. Serial No. 70,445.

This invention is designed to improve electric cooking stoves, particularly those designed for restaurant service. These are provided with pan cake tops and waffle tops and in the preferred embodiment these are formed in units covering the entire stove and are interchangeable. The units are formed with an integral casting forming the covers, an up-turned flange supporting the cooking surface, and a closure plate beneath the flange forming a receptacle for the heating element and an insulation against the heat of the element at the bottom of the stove. Features and details of the invention will appear from the specification and claims.

The invention is illustrated in the accompanying drawings as follows:—

Figure 1:
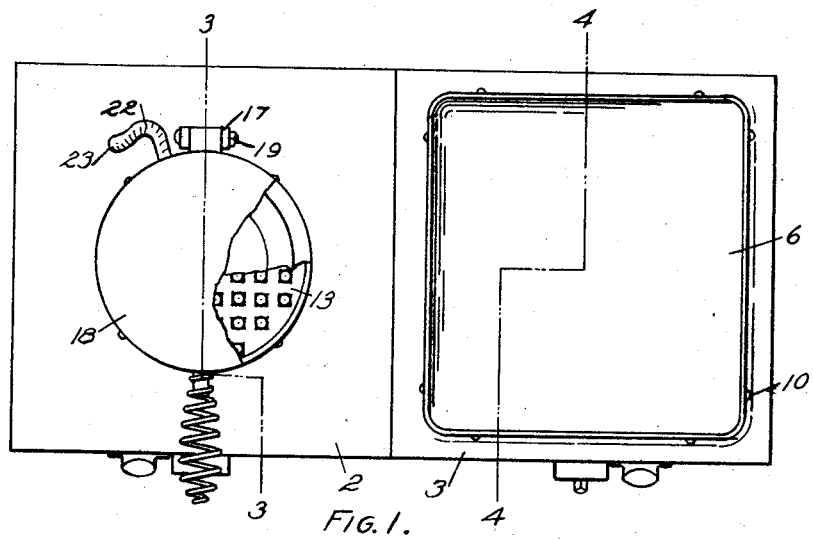
Figure 2:
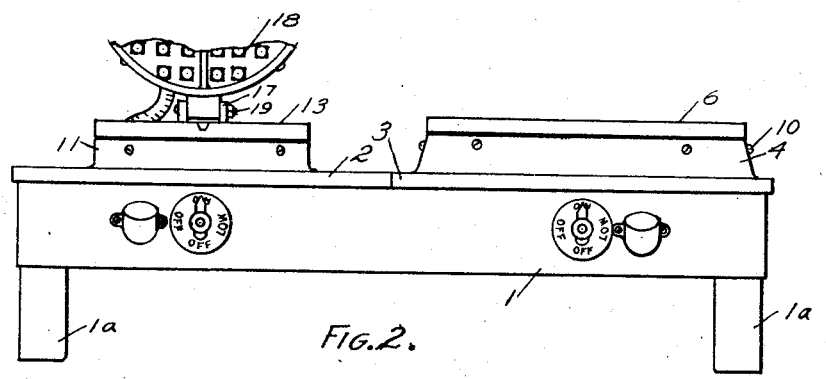
Figures 3, 4:
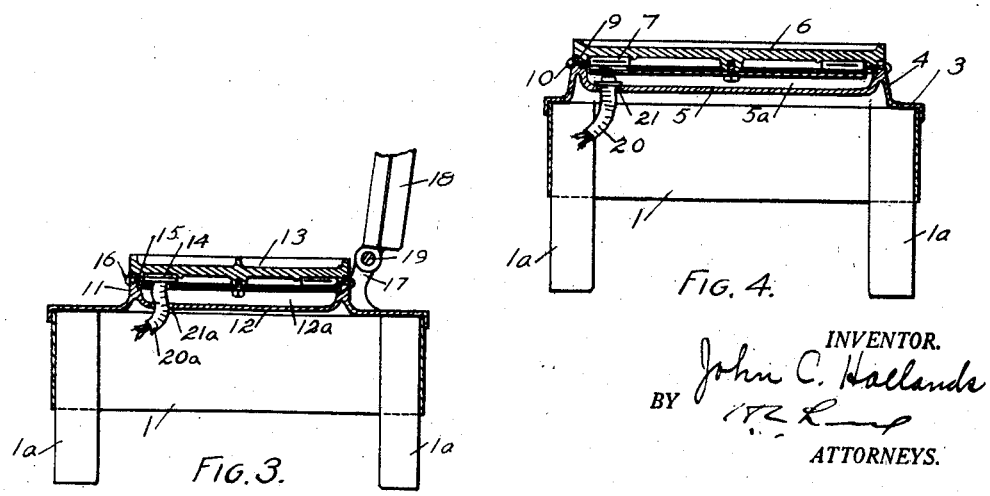

Fig. 1 shows a plan view of the stove.
Fig. 2 a front elevation.
Fig. 3 a section on the line 3—3 in Fig. 1.
Fig. 4 a section on the line 4—4 in Fig. 1.

1 marks the stove frame which comprises an annular plate forming the front, rear and ends of the frame. This is preferably supported by legs 1ª.

Arranged on the plate are the cooking units 2 and 3 which form covers entirely covering the annular plate and which are interchangeable as to size and shape so that the units may be readily exchanged when desired.

The unit 3 has an upwardly extending flange 4 and a closure plate 5 within the flange and formed integrally therewith forming an element receptacle 5ª and insulating the heating element from the bottom. A griddle 6 is arranged above the receptacle 5ª and carries a heating element 7. It has a shoulder 9 extending downwardly into the flange 4 and this is secured by screws 10 extending into the flange.

The unit 2 has an upstanding flange 11 with a closure plate 12 formed integrally within the flange forming an element receiving receptacle 12ª. A waffle iron 13 carries a heating element 14. The waffle iron 13 has a downwardly extending shoulder 15 which extends into the flange 11 and is secured therein by screws 16.

Lugs 17 are formed on the flange 11 and the upper element of the waffle iron 18 is hinged by a pintle 19 on the lugs 17.

A conductor 20 for the element 7 extends through an opening 21 in the plate 5 and a conductor 20ª extends through an opening 21ª in the plate 12 for the element 14. A conductor 22 extends through an opening 23 for the upper element of the waffle iron. These conductors are controlled by switches 24 on the front of the frame.

This makes a cooking utensil without obstruction of any kind on its upper surface, a convenient receptacle for receiving the heating element, and a guard against the heat of the heating element extending downwardly as against anything arranged below the stove.

What I claim as new is:—

1. In an electric cooking stove, the combination of an annular frame plate; a cover plate covering the frame having an upstanding integral flange with an integral closure plate within the flange forming an element receiving receptacle and protector; an electric element in the receptacle; and a cooking plate covering the receptacle and in heating relation with the element.

2. In an electric cooking stove, the combination of an annular frame plate; and a plurality of removable interchangeable cover plates of equal size covering the frame, each having an upstanding integral flange with a closure plate within the flange forming an electric element receiving receptacle and protector.

3. In an electric cooking stove, the combination of an annular frame plate; a plurality of removable interchangeable cover plates of equal size covering the frame, each having an upstanding integral flange with a closure plate within the flange forming an electric element receiving receptacle and protector; an electric element in each receptacle; and a cooking plate covering each receptacle, each plate being in heating relation with the element in the receptacle covered by the cooking plate.

In testimony whereof I have hereunto set my hand.

JOHN C. HOLLANDS.